INVENTORS,
John L. Lindesmith
Edward P. Drake
BY
Fred N. Schwend
ATTORNEY.

INVENTORS,
John L. Lindesmith
Edward P. Drake
BY
Fred N. Schwend
ATTORNEY.

Sept. 4, 1956 J. L. LINDESMITH ET AL 2,761,620

COMPUTING SYSTEM

Filed May 26, 1952 8 Sheets-Sheet 3

INVENTORS
John L. Lindesmith
Edward P. Drake

Fred M. Schwend
ATTORNEY.

Sept. 4, 1956 J. L. LINDESMITH ET AL 2,761,620

COMPUTING SYSTEM

Filed May 26, 1952 8 Sheets-Sheet 4

INVENTORS,
John L. Lindesmith
Edward P. Drake

BY Fred N. Schwend

ATTORNEY.

Sept. 4, 1956 J. L. LINDESMITH ET AL 2,761,620

COMPUTING SYSTEM

Filed May 26, 1952 8 Sheets-Sheet 5

INVENTORS,
John L. Lindesmith
Edward P. Drake
BY
Fred N. Schwend
ATTORNEY.

COMPUTING SYSTEM

Filed May 26, 1952 8 Sheets-Sheet 6

INVENTORS,
John L. Lindesmith
Edward P. Drake
BY
Fred N. Schwend
ATTORNEY.

INVENTORS,
John L. Lindesmith
Edward P. Drake
BY Fred M. Schwend
ATTORNEY.

INVENTORS,
John L. Lindesmith
Edward P. Drake
BY
Fred N. Schwend
ATTORNEY.

United States Patent Office 2,761,620

Patented Sept. 4, 1956

2,761,620

COMPUTING SYSTEM

John L. Lindesmith, Sierra Madre, and Edward P. Drake, Glendale, Calif., assignors to Clary Corporation, a corporation of California Application May 26, 1952, Serial No. 289,978

7 Claims. (Cl. 235—61)

This invention relates to electronic computing apparatus and has particular reference to systems which are capable of recording values computed by such apparatus.

Electronic computing devices are capable of handling data in the form of pulses at a considerably higher rate of speed than mechanical computing machines due to the extremely low inertia of their various components. On the other hand, mechanical computing machines lend themselves more readily to the control of mechanisms for recording the factors and results of problems performed by the machine.

Although electronic computing devices are available which are capable of counting by the decimal numeral system or by such nondecimal systems as the bi-quinary or binary systems, the latter have several advantages which make their use desirable. Primarily, such nondecimal type electronic devices embody fewer counting circuits, resulting in simpler, less expensive and more reliable apparatus.

However, since numerical data is generally represented in the decimal system, certain difficulties arise in understanding and dealing with a nondecimal system, and it is therefore desirable to translate any such nondecimal data into decimal data so that the values may be more readily comprehended and correlated with other data.

In the copending John L. Lindesmith application, Serial No. 259,568 filed on December 3, 1951, an apparatus is disclosed including a plurality of electronic counting decades capable of counting according to a binary system and a scanning system for sequentially sensing amounts registered in the various decades. The scanning system operates through a common binary-to-decimal conversion system to convert the binary amount in each decade to a decimal amount, and sequentially transmits this information into the different denominational orders of a mechanical computing machine. The latter adds and records the various data in decimal form and also records the subtotals of amounts entered into the machine.

The foregoing apparatus operates entirely satisfactorily. However, since amounts from the various electronic counting decades must be sequentially sensed and entered into the appropriate denominations of the computing machine, a noticeable length of time is required in order to transfer the total amount from the electronic counting decades into the machine and to record the same. Although this lapse of time is not detrimental in most instances, there are certain cases where it is desirable to obtain a record of an amount registered by an electronic counter in a minimum amount of time.

It therefore becomes a primary object of the present invention to simultaneously obtain amounts from various decades of an electronic computing apparatus, and to record the sum of such amounts.

Another object is to obtain amounts in a binary form from several decades of an electronic computing apparatus and to simultaneously record the sum of such amounts in decimal form.

Another object is to provide an electronic-mechanical pulse counting system wherein the electronic component scales down the pulse count to a speed such that the mechanical component is capable of counting such scaled-down output and wherein the count accumulated in the electronic counter component may be transferred in a minimum of time to the mechanical component so as to register a total of the pulses counted.

Another object is to reduce to a minimum the interruption time of a pulse train being fed into an electronic counter in order to read-out an amount in said counter.

The manner in which the above and other objects of the invention are accomplished will be readily understood upon reference to the following specification when read in conjunction with the accompanying drawings wherein.

*General arrangement*

Figure 1:
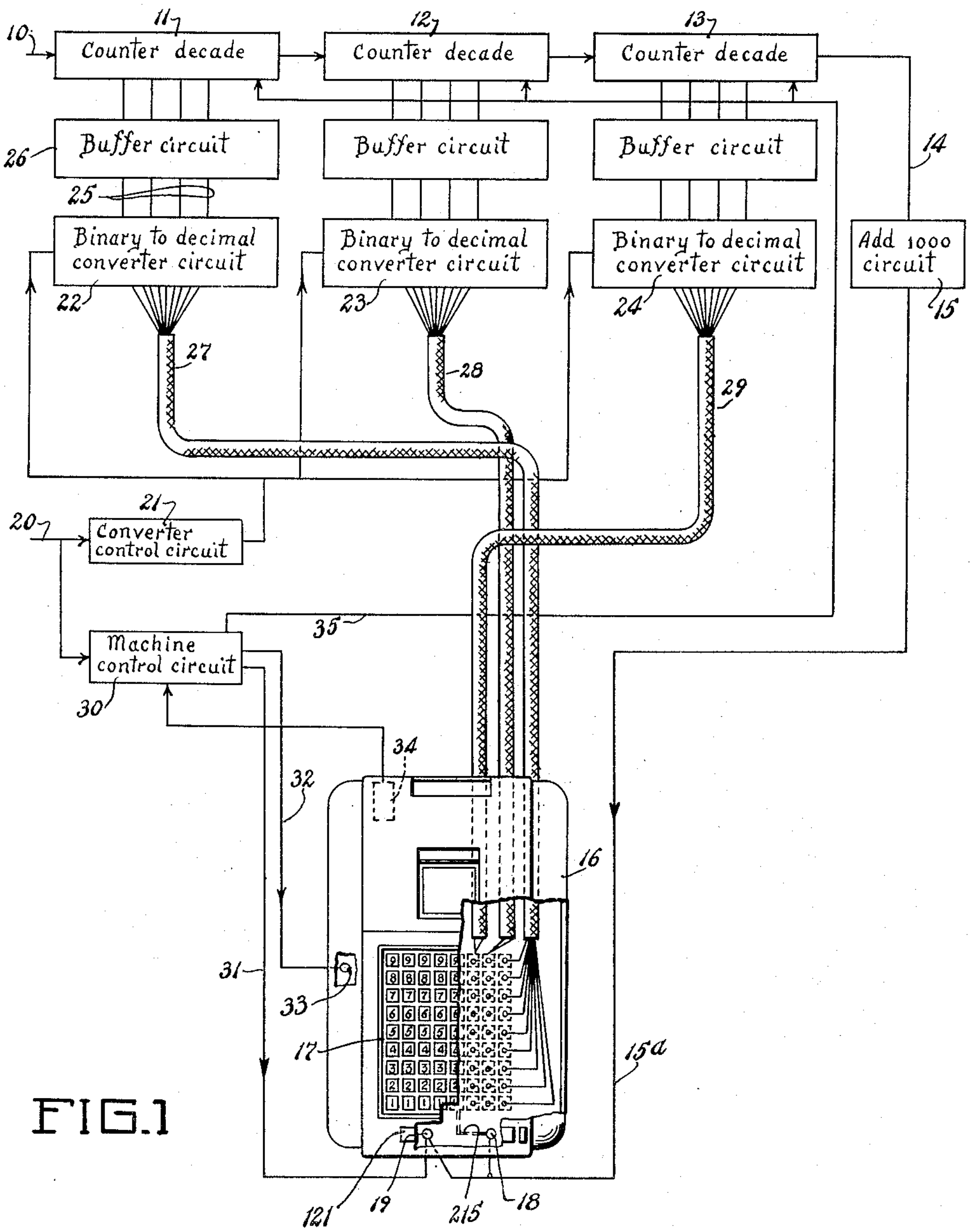
Fig. 1 is a general schematic view of a computing system embodying the present invention.

In order to first obtain a general understanding of the computing system embodying the present invention, reference is had to the layout of the various operating components shown in Fig. 1.

Pulses to be counted are entered over line 10 and are fed into a binary type counter decade 11. The latter has four stages of binary or scale-of-two counting circuits capable of counting from zero to nine. Suitable circuit arrangements transfer a carry-over unit or pulse into a second counter decade 12 upon the accumulation of ten pulses.

The decade 11 is automatically reset at the count of ten preparatory to counting the next ten pulses.

A third counter decade 13 is provided to receive the output from counter decade 12. The various counter decades 11, 12 and 13 are similar in all respects and are thus capable of counting up to 999. The thousandth pulse received by the counter arrangement is effective to reset all of the decades and to transmit a carry-over pulse along a line 14 to an "add one thousand" relay circuit 15.

Intermediate amounts are accumulated and retained in the various counter decades until after such amounts are transferred out of these decades at desired times. The decades are then reset to zero or stand-by condition.

A mechanical computing machine, generally indicated at 16, is provided, having a keyboard 17, a printing mechanism and a mechanical accumulator to be described hereinafter. A solenoid, generally indicated at 18, operatively connected to the "1" key located in the thousands denomination of the keyboard, and a solenoid 19 operatively connected to the add control instrumentalities of the machine are connected through line 15*a* to the relay circuit 15 so that upon energization of the relay 15 the machine will operate to add the unit "1" in the thousands denomination of the machine accumulator and thus register the value 1,000.

Due to the fact that the counts of pulses received over line 10 are scaled down in a ratio of one-thousand-to-one in the present embodiment, pulses may be counted with this system one thousand times faster than the machine is capable of operating. However, with the inclusion of additional electronic decade units a greater scaling factor may be obtained to enable the system to count and accumulate at correspondingly higher rates of speed relative to the speed of the machine.

Whenever it is required to determine and record the total net amount accumulated by the system, a signal pulse is transmitted along line 20 to a converter control circuit 21. The latter controls a series of converter matrix circuits 22, 23 and 24 connected to respective ones of the counter decades 11, 12 and 13 to convert amounts in binary form registered by the various decades and to transmit these amounts in decimal form to corresponding denominational orders of the machine.

The converter circuit 22 is connected by four lines 25, to the respective counter decade 11 through a buffer circuit 26. The circuit 22, in turn, is connected by a group or trunk 27 of nine lines to respective ones of solenoids operatively associated with the nine amount keys in the units denomination of the machine keyboard 17. Likewise, the converter circuits 23 and 24 for the counter decades 12 and 13 are connected through groups 28 and 29, respectively, of nine lines to the key solenoids located in the tens and hundreds denominations of the machine keyboard.

Concurrently with energization of the converter control circuit 21, the control signal will be transmitted to a machine control circuit generally indicated at 30. The latter through line 31 becomes effective to energize the add control solenoid 19 to effect an add operation of the machine.

Control circuit 30 is also effective through line 32 to energize a subtotal control solenoid 33 to cause a subtotalling operation of the machine. However, the latter operation is under control of a switch 34 operated by the machine which delays the subtotalling operation until completion of a current add operation. During subtotalling, the amount registered on the machine accumulator will be recorded. As an incident to a subtotalling operation, a control lead 35 is energized to reset the various counter decades 11, 12 and 13 to their zero positions.

*Counter decade units*

Although any of various forms of counter decades operating on the binary principle may be used, the specific circuit chosen for illustration is similar to that disclosed in the patent to J. T. Potter, No. 2,538,122, and therefore only a general description of the counter is deemed necessary.

Figure 2:
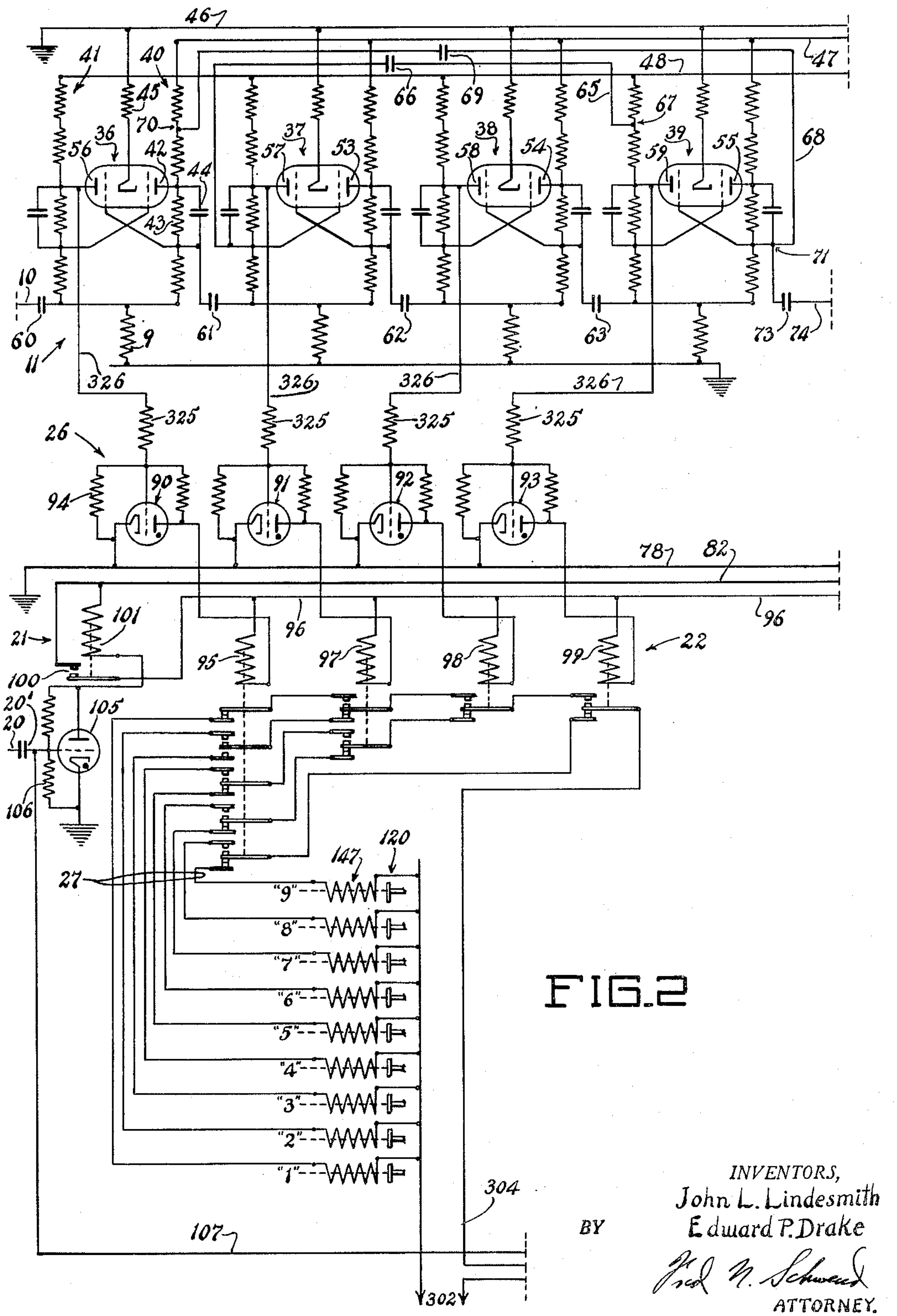
Fig. 2 is a circuit diagram illustrating the units electronic counting decade, the buffer circuits under control thereof, the binary-decimal conversion system and its connection to the units denomination of the mechanical computing machine.
Figure 3:
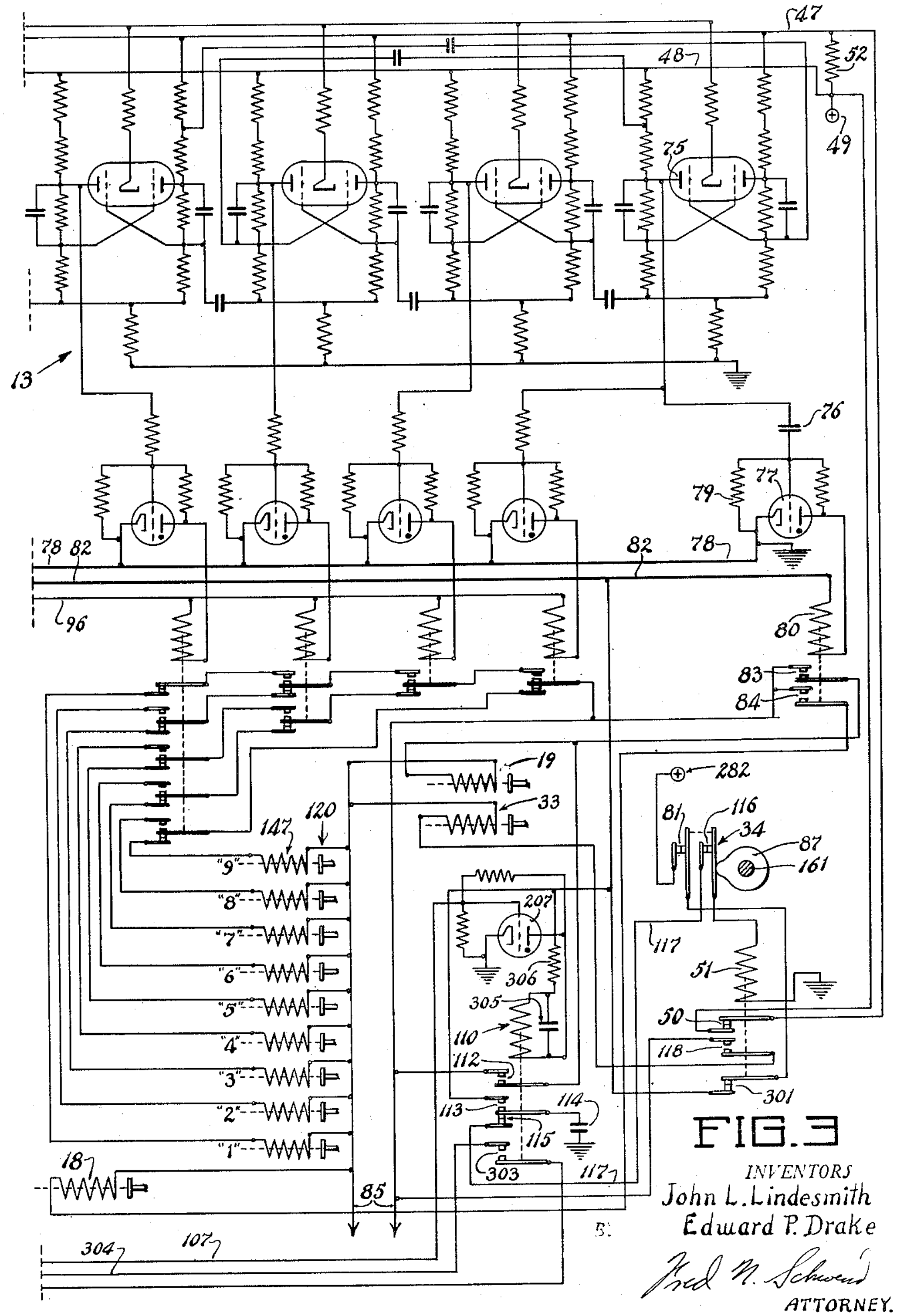
Fig. 3 is a circuit diagram similar to Fig. 2 but illustrating the hundreds counting decade and its connection to the hundreds denomination of the mechanical computer, as well as the various control circuits for the computer.

The units and hundreds counter decades 11 and 13 are shown in detail in Figs. 2 and 3, respectively, and it is to be understood that the tens decade 12 is similar in all respects.

Referring in particular to Fig. 2, the counter decade 11 comprises four bi-stable multivibrator circuits 36, 37, 38 and 39 of the Eccles-Jordan type. Each multivibrator unit includes a two-unit vacuum tube with right- and left-hand voltage divider circuits 40 and 41 associated with respective units of the tube. Each pair of voltage divider circuits is connected to ground through a common resistor 9.

The anode of each tube unit is cross-connected to the grid of the opposite tube unit through a parallel connected capacitor and resistor, the latter forming the middle branch of the associated voltage divider. For example, the anode 42 of the right-hand unit of the first tube is connected through resistor 43 and condenser 44, in parallel, to the grid of the left-hand unit of the tube. The cathode of each tube is connected through a bias resistor 45 to a ground line 46.

Anode potential is normally applied from two anode supply lines 47 and 48 to the upper ends of the voltage dividers, like 40 and 41, from a positive potential source 49 (Fig. 3). The latter is directly connected to the line 48 which, in turn, is connected to the upper ends of the left-hand voltage dividers, like 41. The other anode supply line 47, which is connected to the right-hand voltage dividers, like 40, is connected to the potential supply source 49 through normally closed contacts 50 of a subtotal control relay 51 (forming part of the machine control circuit 30), thereby normally supplying equal potential to both voltage dividers in each stage.

A resistor 52 is connected across the anode supply lines 47 and 48 for counter resetting purposes as will appear hereinafter.

Normally, in zero or stand-by condition of each counter decade, the right-hand unit of each tube is in a conducting state and the left-hand unit is rendered nonconductive by virtue of the lowered potential on the left-hand grid. Thus, in zero condition, the right-hand anodes 42, 53, 54 and 55 are at relatively low potential, and the left-hand anodes 56, 57, 58 and 59 are at relatively high potential.

Negative pulses to be counted are applied through the line 10 and a coupling condenser 60 to the lower ends of the voltage dividers 40 and 41 in the first (left-hand) counter stage 36. The positive side of each pulse has no effect since the grid of the right-hand side is already positive, inasmuch as this side of the tube is conducting, while the values of the voltage dividers are so chosen that the grid on the left-hand side will not be driven far enough positive to cause conduction of the left-hand side at this time. However, the negative side of the pulse will lower the potential of the right-hand grid to below the tube cut-off point, thus raising the potential of the plate 42. This rise in voltage is applied through condenser 44 to the left-hand grid, raising the latter above its cut-off potential and causing the left-hand side of the tube to conduct to thereby lower the potential of anode 56.

The second pulse received on line 10 will again lower the potential on both grids of the first tube to reverse the condition of the latter back to its original state, and in so doing will again lower the potential of anode 42, thereby transmitting a negative pulse through coupling condenser 61 to the lower ends of the voltage dividers in the second stage 37.

The various counting stages are connected in series through coupling condensers 61, 62 and 63. Thus, upon each second reversal of a previous stage, a negative pulse will be transferred to a new stage to reverse the condition thereof whereby to change the potential of the right-hand anode from a high value to a low value.

The natural sequence of circuit conditions occurring on reception of the different pulses will be found to occur according to the following table wherein X represents a high anode potential and O represents a low anode potential:

| Pulse | Stage 1 | Stage 2 | Stage 3 | Stage 4 |
|---|---|---|---|---|
| 0 | (left-hand) XO (right-hand) | XO | XO | XO |
| 1 | OX | XO | XO | XO |
| 2 | XO | OX | XO | XO |
| 3 | OX | OX | XO | XO |
| 4 | XO | XO | OX | XO |
| 5 | OX | XO | OX | XO |
| 6 | XO | OX | OX | XO |
| 7 | OX | OX | OX | XO |
| 8 | XO | XO | XO | OX |
| 9 | OX | XO | XO | OX |

Following the above sequence of events, the normal return of each counting decade to its zero condition wherein all right-hand tube anodes are conductive, i. e., at a low potential, would occur at the count of 16. In order to effect return of the unit to its zero condition at the count of 10, certain feedback circuits are incorporated. These circuits comprise a line 65 and condenser 66 connected from a point 67 on the left-hand voltage divider for stage 39 to the right-hand grid of the tube in stage 37. A second line 68 and condenser 69 is connected from point 70 on the right-hand voltage divider 40 of stage 36 to point 71 to which the left-hand grid of the tube in stage 39 is connected.

Although a drop in potential is applied along line 68 to the point 71 during every second reversal of the stage 36, this drop is insufficient to block the normally conducting anode 55 of stage 39 and, obviously, the grid of the left-hand section of the tube of this stage is already below its cut-off potential. However, on the reception of the eighth count the condition of the stage 39 is reversed, raising the potential of anode 55 and consequently the left-hand grid of the corresponding tube. The stage 39 remains in this condition through the ninth count, and upon reception of the tenth pulse the anode 42 in the first stage again drops in potential to send a negative pulse through line 68 to the point 71. In view of the high potential existing on the grid of the left-hand tube in stage 39 at this time, the latter grid is driven below cut-off potential, reversing the condition of stage 39 and sending a negative pulse through a coupling condenser 73 and carry-over line 74 to the first stage of the tens counting decade (Fig. 1).

Consequently, all stages are now returned to their original or zero conditions, but in order to prevent reversal of the second stage 37 due to transfer of a negative pulse from stage 36 thereto due to the reversal of the latter stage at the count of 10, the circuit including line 65 transmits a positive pulse from point 67, incident to a rise in voltage of anode 59 of stage 39 as the latter is reversed to its original condition, and this positive pulse is fed into the right-hand grid of the tube in stage 37, thereby preventing the incident negative pulse from stage 36 from reversing stage 37 at this time.

*"Add one thousand" circuit*

The second and third counter decades will operate in the same manner as the first decade 11. Consequently, upon registration of the tenth pulse in counter decade 13 (Fig. 3) representative of the thousandth pulse registered by the counter system, the anode 75 of the last tube will rise in potential, thus transmitting a positive pulse through a coupling capacitor 76 to the igniter of a normally nonconducting tube 77. The latter is preferably of the cold cathode, glow discharge type, for example, Type No. 5823. The cathode of the latter tube is connected to a ground line 78, and a bias resistor 79 is connected between the cathode and igniter to normally positively bias the latter to a point slightly below its triggering potential. Thus, as tube 77 is rendered conductive, a circuit is completed through the coil of an "add-one-thousand" relay 80 (forming part of circuit 15), a normally energized supply line 82, normally closed contacts 301 of subtotal relay 51 and normally closed contacts 81 of the machine switch 34 to a plus supply source 282, thereby closing contacts 83 and 84 of the relay 80.

Contacts 83 are connected in circuit with the aforementioned add solenoid 19 across a 115 volt power supply circuit 85, whereas contacts 84 are connected in circuit with the solenoid 18 across the power supply circuit 85, the solenoid 18 being operatively associated with the "1" key in the thousands denomination of the machine. Therefore, an add operation of the machine will ensue to enter the value 1,000 into the machine accumulator.

As the machine operates, a cam 87 on a machine drive shaft 161 operates to open the machine switch contacts 81, thereby opening the anode circuit for the tube 77 to de-energize relay 80 and return the tube 77 to its nonconductive condition.

*Buffer circuits*

The various stages of each counter decade are connected to the respective converter circuit, i. e., 22 (Fig. 2), through a plurality of buffer stages, including tubes 90, 91, 92 and 93. The latter tubes are of the cold cathode, glow discharge type, similar to tube 77.

The cathodes of the various buffer tubes are connected to ground line 78, and a bias resistor, like resistor 94, is provided between the cathode and grid of each tube to positively bias the latter to a point just below its triggering potential.

The anode of the first buffer tube 90 is connected in circuit with one end of the winding of a converter matrix relay 95 (forming part of converter circuit 22), the other end of which is connected to a normally de-energized power supply line 96. Likewise, buffer tube 91 has its anode connected in circuit with the supply line 96 through the winding of the second matrix relay 97. Correspondingly, the anode circuits of buffer tubes 92 and 93 are connected in circuit with the line 96 through windings of additional matrix relays 98 and 99.

The supply line 96 is adapted to be operatively connected to the normally energized plus supply line 82 through normally open contacts 100 of a matrix read-out relay 101 (included in the circuit 21), the latter relay being energized upon reception of a signal pulse on the line 20 as will appear in detail hereinafter.

The igniters of the various buffer tubes 90 to 93 are connected through isolating resistors 325 and lines 326 to respective left-hand anodes of the various counter stage tubes. Accordingly, binary "0" representations will manifest themselves by application of positive potentials applied to the grids of different ones of the buffer tubes sufficient to cause conduction of such tubes, and to thereby effect energization of the respective ones of the matrix relays 95 to 99 when the matrix read-out control relay 101 is energized. On the other hand, binary "1" representations will manifest themselves by de-energization of the respective matrix relays.

*Binary-to-decimal converter circuits*

The converter matrix relays 95 to 99 comprising the converter circuit 22 include varying numbers of double throw and single throw switch contacts effective in different combinations to convert a value represented in a binary form by the various relays to a decimal amount by completion of a circuit through one of the group of nine lines 27, and respective amount key solenoids 147, whereby the corresponding decimal amount may be set up in the respective denomination of the machine keyboard.

It will be noted that the various relay contacts of matrix relays 95 to 99 are connected in circuit with respective ones of the nine lines 27 and their amount key solenoids across a 115 volt power circuit 302. The latter power circuit is normally held in open condition by normally open relay contacts 303 (Fig. 3) located in line 304 of the circuit and forming part of an add control relay 110 to be described presently. The relay 110 is delayed slightly in its operation so that power for operating a selected amount key solenoid will be withheld until the selected matrix relays have been energized.

*Read-out controls*

As noted hereinbefore, application of a signal pulse over line 20 (Figs. 1 and 2) is effective to cause a transfer of a count registration in the electronic counter into the computing machine and to effect successive add and subtotalling operations of the latter.

The line 20 is connected through a coupling capacitor 20' to the igniter of a cold cathode, grid discharge tube 105 having its anode in circuit with the winding of relay 101 and the plus supply line 82. A bias resistor 106 normally biases the grid of this tube to a potential just below its triggering point, but upon application of a positive pulse, the latter conducts to energize relay 101 and thereby establish circuits through whichever matrix relays (in the various counter decades) have been conditioned by their respective counter stages and buffer tubes.

Simultaneously, the signal pulse is transmitted along line 107 (Figs. 2 and 3) to the igniter of a normally non-conducting cold cathode, glow discharge tube 207. The anode of tube 207 is connected in circuit with the coil of the add control relay 110 and normally energized plus supply line 82. Consequently, relay 110 will be energized to close relay contacts 112 in circuit with the add control solenoid 19 across the power supply line 85, thereby to cause an add cycle of the machine.

Simultaneously, add relay contacts 113 are closed, connecting one side of a condenser 114 to the plus supply line 82, the other side of the condenser being grounded. Also, contacts 303 close, as noted hereinbefore, to complete the power circuit for the amount key solenoids 147. In order to insure that relay 110 operates after relay 101, a delay circuit is provided comprising condenser 305 connected in parallel with the winding of relay 110 and resistor 306 connected in series therewith, thus providing a delay of approximately 15 microseconds in the operation of the add control relay.

As the machine cycle ensues to add amounts transferred from the electronic counter into the machine keyboard, the cam 87 actuates switch 34 to open contacts 81, thereby de-energizing all relays including relay 110, which were held energized by current from the line 282.

As the relay 110 drops, relay contacts 115 thereof close, connecting the upper side of condenser 114 to line 117, and as the machine completes its cycle, the cam 87 again actuates the switch 34 to close contacts 116 included in line 117. Contacts 116 now connect the condenser 114 through the winding of subtotal relay 51 to ground, whereby to energize the latter relay. Relay contacts 301 now open to de-energize the supply line 82. Also, contacts 50 now open to reset the various counter decades as will appear in detail hereinafter, and contacts 118 likewise close, establishing a circuit through subtotal control solenoid 33 across the power supply line 85 to initiate a subtotal operation of the machine. Thus, the anode supply circuit for tube 77 is opened before resetting of the counter decades can in any way erroneously effect firing of the latter.

*Counter reset control*

During and after sensing of amounts in the various counter decades, the latter retain registration of these amounts, and in order to prevent erroneous registration of the counter due to possible spurious entry of pulses as an incident to power surges, etc., resulting from operation of the machine or its controls, the resetting of the counters is delayed until the subtotal operation of the machine.

As the normally closed contacts 50 of the subtotal relay 51 are opened by energization of this relay, the resistance 52 is effectively placed across the lines 47 and 48 to lower the potential applied to the various right-hand voltage dividers of the different counting stages in all of the counter decades. Consequently, the potentials of the grids on the left-hand sides of the various counter tubes are lowered to block the respective tube units and as the contacts 50 are again closed, the rise in voltage in the right-hand side voltage dividers causes conduction of the right-hand side of each tube, thereby returning each of the various counter stages to its zero condition.

*Computing machine—general construction*

The construction of the computing machine generally indicated at 16 in Fig. 1 and illustrated in Figs. 4 to 8, inclusive, is basically similar to that found in the well known Clary adding machine which is disclosed and claimed in the Patent No. 2,583,810 issued to R. E. Boyden on January 29, 1952. The accumulating mechanism is disclosed in detail and claimed in Patent No. 2,472,696, issued to E. P. Drake on June 7, 1949.

Since the basic structure of the machine is disclosed in the above patents, only those portions thereof which relate to the present invention will be described in detail. Reference is made to the above patents for a complete disclosure of the machine. However, it is to be understood that the invention is not limited to the particular machine disclosed.

The machine includes a series of denominationally arranged banks or orders of amount keys, generally indicated at 120. A plurality of depressible machine control bars is provided for controlling various operations of the machine and includes an add bar 121 (Figs. 4 and 5), a subtract bar 122 (Fig. 7) nonadd bar 123, subtotal bar 124 and total bar 125. The latter bars, upon depression, are effective to cause operation of the machine to perform respective functions controlled by the bars. As was previously noted and as will be described in detail, the various amount keys 120, and the add and subtotal bars are provided with solenoids located in the general control circuits whereby the latter keys and bars may be automatically depressed during operation of the system in response to a control signal.

*Keyboard*

The keyboard is of the flexible type and each amount key 120, when depressed, serves as a stop to differentially limit movement of an associated drive rack 126 (Fig. 4) which both drives an accumulator, generally indicated at 127, to enter a value corresponding to the value of the depressed key, and to also set a printing mechanism, generally indicated at 128 so as to print the various amounts on a paper tape 129.

The amount keys are provided with key stems 130 slidably mounted in guide slots formed in key plates 131 and 132 suitably secured to the frame of the machine in a manner not shown. In all orders of the machine except the three lowermost banks, i. e., the three banks to the right in Fig. 5, the key stems 130 rest on plungers 133 slidable in bushings 134. The latter are suitably fastened on a plate 135 which is also fastened in a suitable manner (not shown) to the machine framework. Plungers 133 rest on sub key stems 136 slidable in guide slots formed in key support plates 137 and 138, also supported in a suitable manner (not shown) by the machine framework.

Spring means (not shown) are provided for individually urging all of the sub key stems 136, and consequently the amount keys, into their upper illustrated positions. Means are provided for locking the key stems in depressed position and for releasing any previously depressed key in the same key bank upon depression of a new key. For this purpose, each sub key stem 136 is provided with a cam lobe (not shown) which, when the respective key is depressed, rocks a locking bail 140 pivoted at either end thereof by trunnion bearings 141 formed in walls extending upwardly from the bottom key plate 138. At the bottom of a key stroke, the cam lobe passes below the locking bail, enabling the latter to retract partially under the urge of a spring 142 to a position wherein it latches the key stem depressed in the path of an associated shoulder 143 on the aligned rack 126. The various shoulders 143 are so spaced relative to their associated key stems that the rack will advance a number of increments equal to the value of the depressed key before being arrested thereby.

A zero block 144 is formed on each locking bail 140 and when no amount key in the respective bank is depressed, the locking bail of that bank will be spring held in a position wherein the zero block 144 is located directly in front of one of the shoulders 143, thereby preventing substantial movement of the rack during subsequent operation of the machine. However, when an amount key is depressed, its locking bail will be held outward sufficiently to retain the associated zero block out of the path of the aligned rack.

In the lower three orders of the machine, the amount key stems rest on armatures 146 of solenoids 147 suitably attached to the plate 135. The armatures are attached to non-ferrous rods 148 overlying aligned ones of the sub key stems 136 whereby energization of selected ones of the solenoids will cause their armatures to depress respective ones of the sub key stems.

*Printer*

The various values registered on the racks 126 during item entering, subtotalling or totalling operations are recorded on the paper tape 129 (Fig. 4) by the printing mechanism 128 when the racks 126 have been differentially advanced to different positions under control of the various keys or under control of the accumulator.

The printer comprises a series of type wheels 150, each entrained with a respective one of the racks. Each type wheel has a series of type therearound ranging in value from "0" to "9," and each wheel is so connected to its rack as to eventually print a digit corresponding to the numerical position to which the rack is advanced.

Each wheel is rotatably mounted on a separate arm 151 carried by a printer control shaft 158. Each arm is urged clockwise by an individual spring 152 tensioned between the arm and a suitable portion of the machine frame. A gear 153 is integrally secured to each type wheel and meshes with a second gear 154 also mounted on the associated arm 151.

Figure 4:
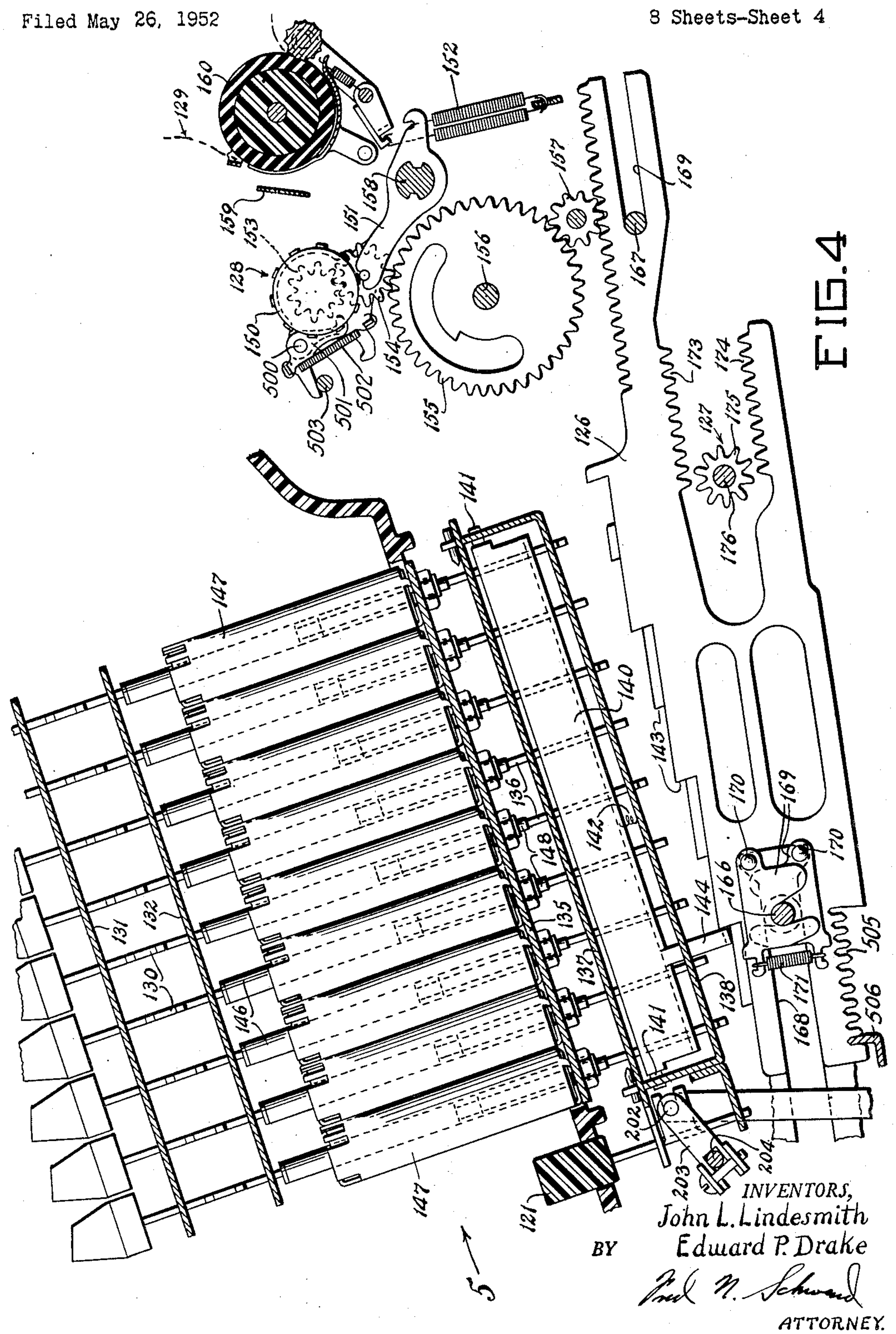
Fig. 4 is a longitudinal sectional view through part of the mechanical computer, illustrating the mechanical accumulator and printing instrumentalities, and is taken substantially along the line 4—4 of Fig. 5.
Figure 5:
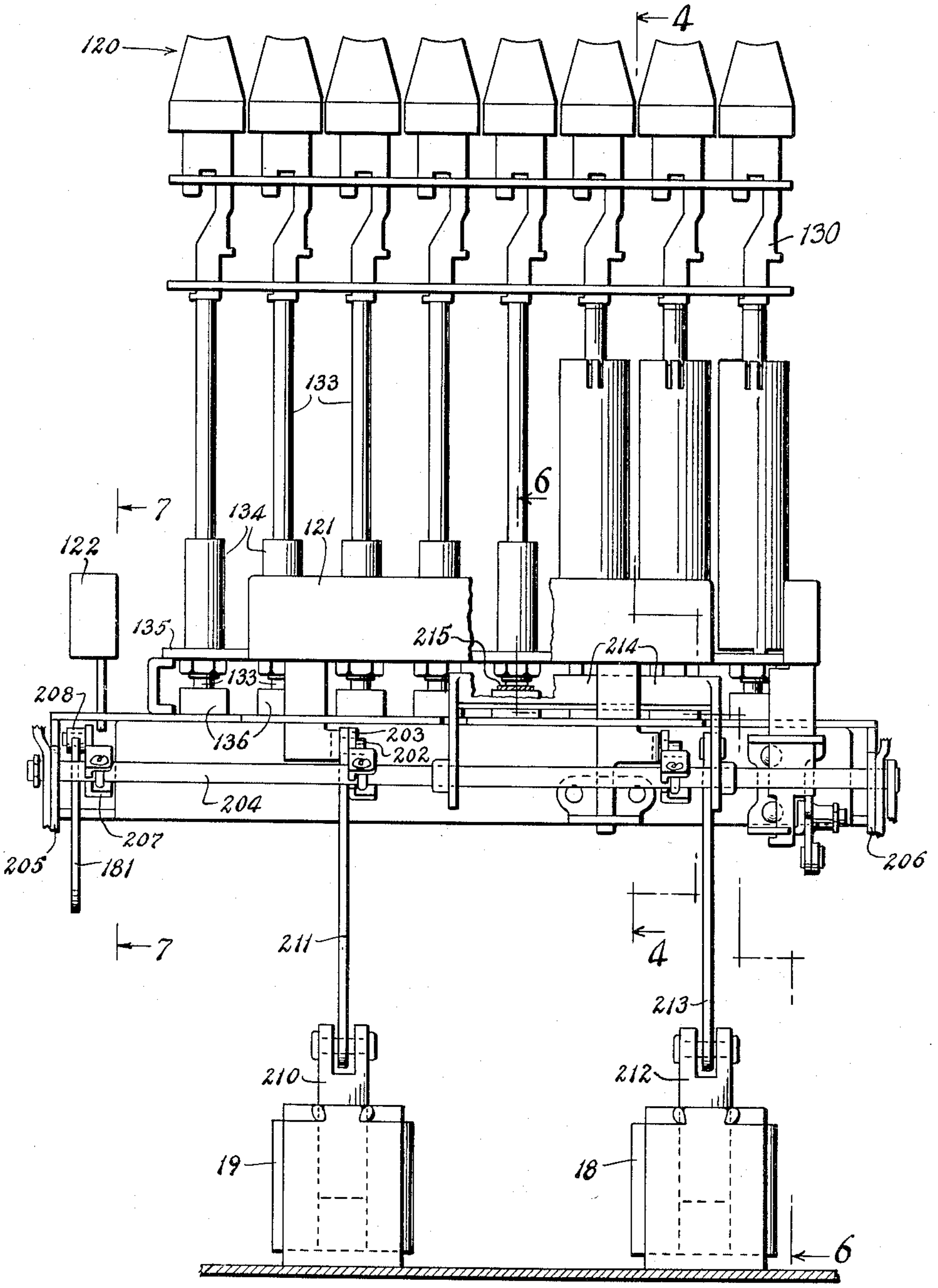
Fig. 5 is a front view of the machine and is taken in the direction of the arrow 5 of Fig. 4.

Except during a printing operation, the arms 151 are held in their positions illustrated in Fig. 4 wherein each gear 154 meshes with an aligned idler gear 155. The various idlers are rotatably mounted on a stationary shaft 156 and are continuously entrained with respective ones of the racks 126 through a series of pinion assemblies, one of which is shown at 157.

During a printing phase of a machine cycle, and after the various type wheels 150 have been registered, the printer control shaft 158, on which the various type wheel arms 151 are loosely keyed, is rocked clockwise permitting the springs 152 to carry the arms 151 and type wheels 150 rearwardly to contact the wheels with a printing ribbon 159 and thereby print the digits registered by the type wheels onto the paper tape 129 as the latter passes over a platen 160. The arms 151 are immediately returned to mesh the gears 154 with the idler gears 155 after printing.

Means are provided to insure remeshing of the gears 154 with their respective idler gears 155 in the same relative positions which they occupied prior to the printing operation. For this purpose, each arm has pivotally supported thereto at 500, a pawl 501 urged counter clockwise relative thereto by a spring 502 tensioned between ears on the pawl and arm 151. When arms 151 are held in their normal positions shown in Fig. 4, tails on the pawls 501 engage a stationary cross rod 503 which is effective to hold all of the pawls out of engagement with the associated type wheel gears 153. However, during the printing operation when the arms 151 are rocked clockwise to effect printing, their pawls recede from the rod 503, permitting the springs 502 to rock the pawls into detenting engagement with certain of the teeth of gear 153, thus locking the type wheels into place. When the arms 151 return to normal position, their pawls 501 again engage the rod 503 to release the gears 153.

In order to lock the various racks 126 in position during printing operations, each rack is provided on the under edge thereof with a series of spaced teeth 505. During a printing operation, and at the end of a cycle, a lock bail 506 is moved upwardly by means (not shown) into engagement with aligned ones of the teeth 505, hereby retaining the racks in their adjusted positions.

*Machine drive instrumentalities*

Figures 6, 7:
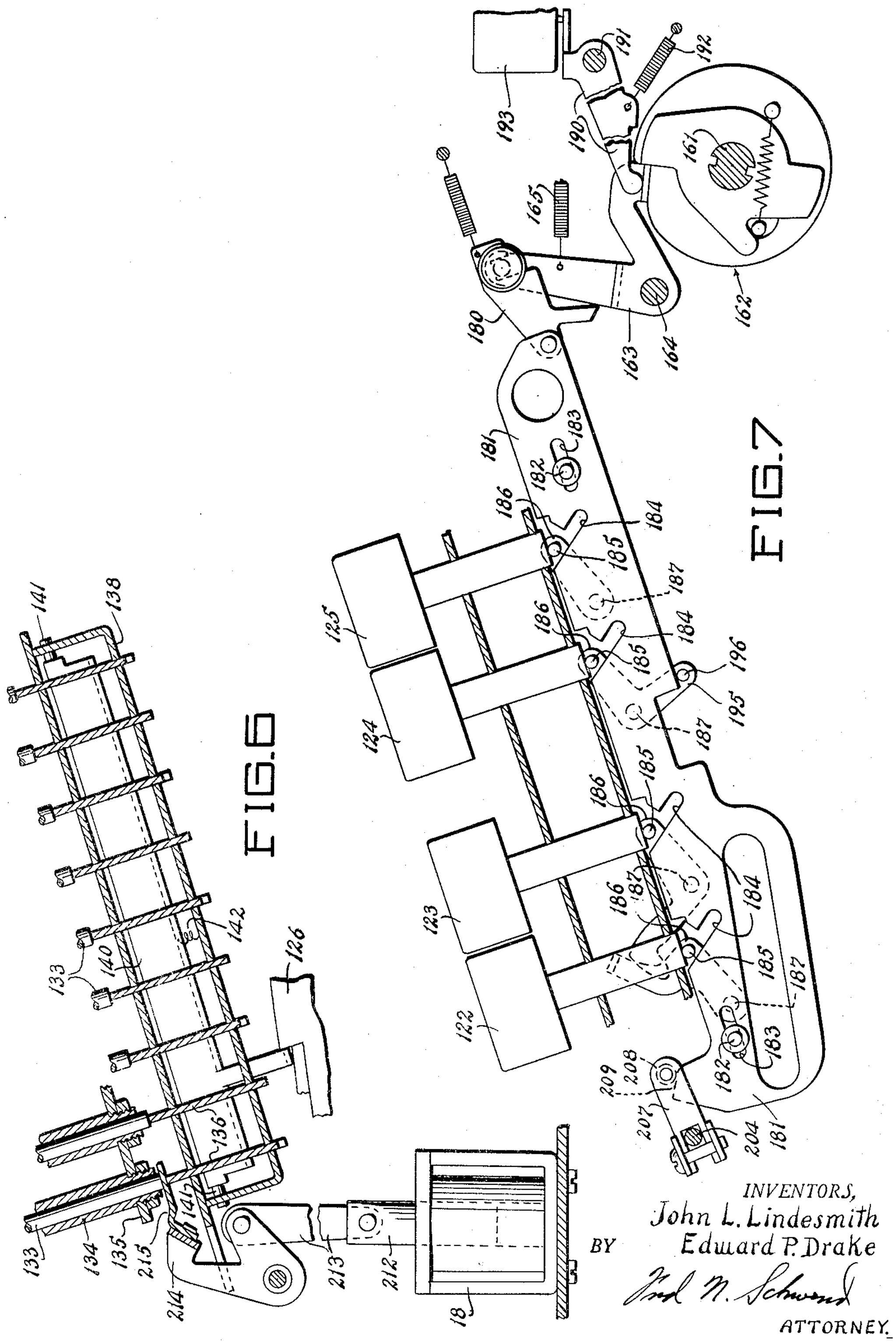
Fig. 6 is a fragmentary view taken substantially along the line 6—6 of Fig. 5, illustrating the solenoid and linkage for depressing the "1" amount key in the thousands denominational order or bank of the machine.
Fig. 7 is a sectional elevational view illustrating the machine clutch and controls therefor, and is taken along the line 7—7 of Fig. 5.

Referring to Fig. 7, the machine is driven by a main drive shaft 161 through a cyclic clutch, generally indicated at 162, from a suitable electric motor (not shown). The clutch is controlled by a clutch dog 163 pivoted at 164 and urged by a spring 165 into its illustrated position where it maintains the clutch in disengaged condition.

Means (not shown) are provided for yieldably transmitting a driving movement from the main shaft 161 to the various drive racks 126 so as to yieldably advance the latter until arrested by depressed keys during item entry operations or by the accumulator during totalling and subtotalling operations.

The racks are supported for fore and aft movement by shafts 166 and 167 embraced by guide slots 168 and 169, respectively, in each rack. The shaft 166 is moved fore and aft of the machine once during each cycle. This shaft is yieldably connected to each rack by pairs of opposed drive elements 169 pivotally mounted on the shafts and carrying rollers 170 which normally engage in lateral depressions formed at the closed ends of each rack slot 168. A spring 171 urges the drive elements 169 outwardly to normally hold the rollers 170 in the lateral depressions until the respective rack is arrested, at which time the rollers move out of the depressions and along the edges of the slot 168.

For the purpose of enabling the various racks to drive the accumulator 127 additively or subtractively, each rack is provided with a pair of rack gear sections 173 and 174 located on opposite sides of an aligned accumulator gear 175. The various gears 175 are independently and rotatably mounted on an accumulator shaft 176, suitable tens transfer mechanism (not shown) being associated with the various accumulator gears as is well understood in the art and as shown in the above noted Drake patent.

During adding operations, the accumulator will be raised in a manner to be described in detail hereinafter, into mesh with the upper rack sections 173 so that the accumulator gears will be eventually rotated in a counterclockwise direction during the forward movement of the racks.

During subtractive and totalling operations, the accumulator will be lowered to mesh the accumulator gears 175 with the lower rack gear sections 174 to rotate the gears in a clockwise direction during forward movement of the racks.

Normally, the accumulator will be returned to its neutral illustrated position before the racks are returned to their home positions. However, during subtotalling operations, the accumulator gears will be held in mesh with the lower rack gear sections 174 during both forward and return movement of the racks.

*Clutch controls*

Means are provided whereby depression of various ones of the machine control bars, either manually or automatically under control of the general control circuits, will cause engagement of the clutch 162 (Fig. 7)

and operation of the machine. For this purpose, the aforementioned clutch dog 163 is connected through a coupling member 180 to a clutch control bar 181. The latter is supported for fore and aft movement by frame studs 182 embraced by elongated slots 183 in the control bar.

Figure 8:
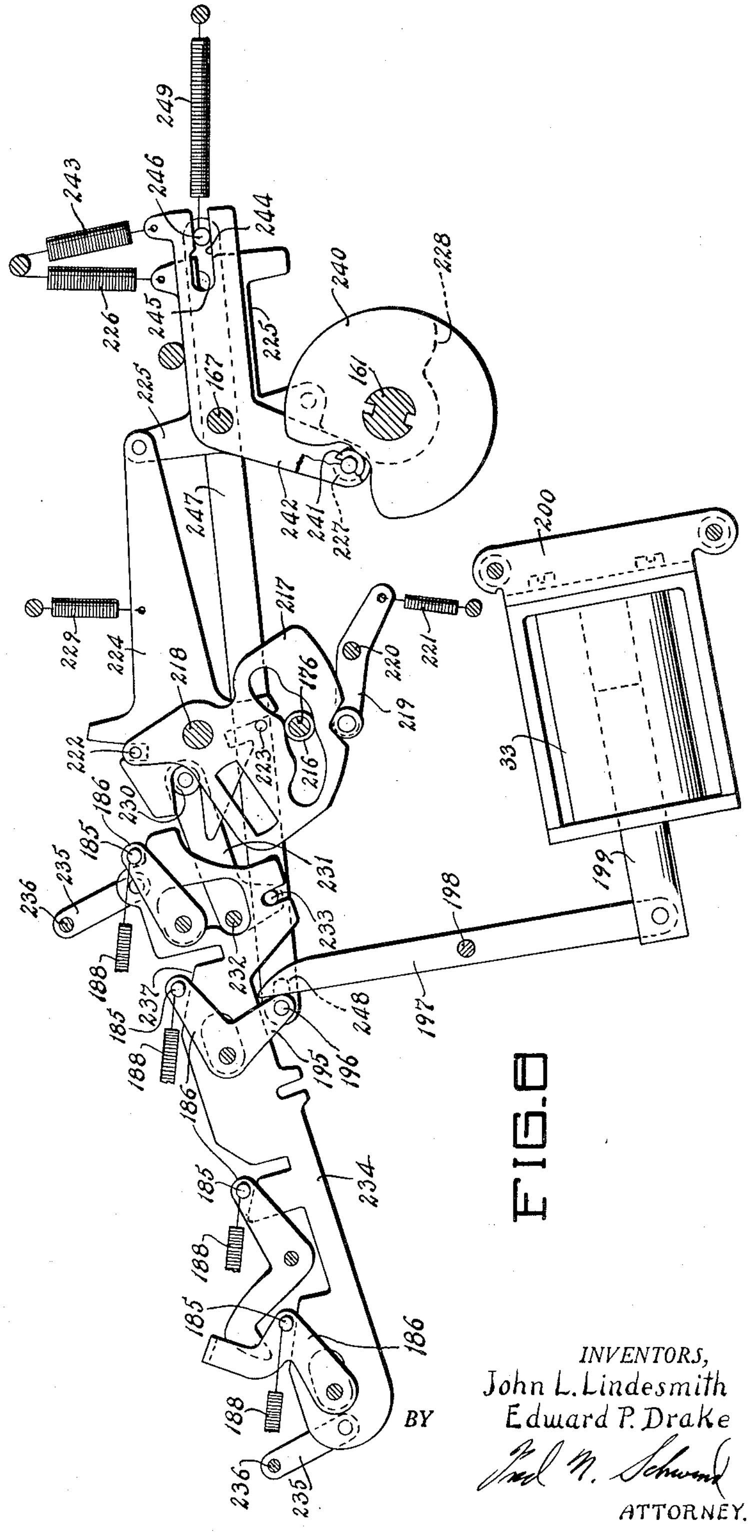
Fig. 8 is a sectional elevational view illustrating the accumulator positioning controls as well as the solenoid and linkage for effecting a subtotal operation of the machine.

Four diagonal cam slots 184 are formed in the control bar 181 and underlie pins 185 carried by arms 186, the latter being pivoted on frame pins 187 and urged upwardly by springs 188 (Fig. 8). The various pins 185 also directly underlie the stems of control bars 122–125, inclusive, whereby depression of any of said bars will be effective to cam the clutch control bar forward to rock clutch dog 163 counterclockwise and thereby cause engagement of the clutch.

The clutch dog is also effective to cause operation of the machine motor, and for this purpose an ear on the dog underlies a motor switch lever 190, pivoted at 191, and urged counterclockwise by spring 192 against an ear formed on the clutch dog. The right-hand portion of the lever 190 engages an actuating element of a normally closed switch generally indicated at 193.

Means are provided whereby the subtotal control solenoid 33 is effective to automatically cause engagement of the clutch 162, and for this purpose arm 186 associated with the subtotal bar has a depending leg 195 extending therefrom and provided with a pin 196 engageable by a lever 197 pivoted on a frame stud 198 and connected to the armature 199 of the solenoid 33. The latter is attached by a bracket 200 to the machine framework and thus upon energization thereof, its armature 199 will be drawn rearward to cause lever 197 to rock the subtotal lever 195 in a clockwise direction and accordingly actuate the clutch control bar 181.

Means are provided whereby the add control solenoid 19 is effective to cause engagement of the clutch 162 and effect add operations of the machine. The add bar 121 (Figs. 4 and 5) has its stems slidably supported in guide slots formed in extensions of the key plates 137 and 138. One of the add bar stems is connected through a pin and slot connection 202 to an arm 203 fastened on a rock shaft 204. The latter is rockably mounted in machine frame plates 205 and 206 and also has secured thereto a camming arm 207 (Fig. 7) carrying a roller 208 which engages a camming surface 209 formed on the fore part of the clutch control bar 181. Depression of the add bar will cause clockwise rocking of the shaft 204, thereby causing the arm 207 to cam the clutch control bar 181 forwardly to effect engagement of the clutch.

The add control solenoid 19 is suitably secured to the machine framework, and its armature 210 is connected through a link 211 to the aforementioned arm 203 so that energization of this solenoid will automatically depress the add bar and effect operation of the machine.

The aforementioned solenoid 18 (Figs. 1 and 6), effective to enter the value 1,000 into the computing machine, is suitably attached to the machine framework, and its armature 212 is connected through a link 213 to one leg of a bail 214. Both legs of the latter are freely pivoted on the aforementioned rockable add control shaft 204. An extension 215, suitably secured to the bail, is interposed between the plunger 133 and the associated sub key stem 136 of the "1" amount key in the thousands denomination, whereby energization of the solenoid 18 will effect rocking of the bail 214 to depress the sub key stem and thereby set up the value 1 in the thousands order.

*Accumulator controls*

As noted hereinbefore, the accumulator 127 (Fig. 4) is raised or lowered into mesh with upper or lower rack gear sections of the various drive racks 126 in accordance with the type of operation being performed. For this purpose, mechanism illustrated in Fig. 8 is provided under control of the various machine control bars and solenoids for determining and effecting positioning of the accumulator.

The accumulator shaft 176 is provided with rollers on opposite ends thereof, one of which is shown at 216 embraced by a cam slot formed in a box cam 217, the latter being pivoted on the frame stud 218. Suitable means (not shown) are provided for effecting parallel movement of the two box cams.

The box cam 217 is normally held in its illustrated neutral position by a centralizer lever 219 pivoted at 220 and urged clockwise by spring 221 to normally maintain a roller on the centralizer in a centralizing notch formed on the lower periphery of the box cam. Clockwise rocking of the cam 217 from its illustrated position will raise the accumulator into mesh with the upper rack gear sections 173 (Fig. 4) of the various racks, while counterclockwise rocking of the cam from its neutral position will lower the accumulator into mesh with the rack gear sections 174.

Means are provided for selectively rocking the cam 217 into either of its alternate positions, and for this purpose the cam carries a pair of pins 222 and 223 extending on opposite sides of its pivot stud 218. These pins are adapted to be selectively engaged by a double hook member 224 pivotally connected to a cam follower 225 fulcrumed on one end of the aforementioned cross shaft 167.

The cam follower 225 is urged counterclockwise by spring 226 to press a roller 227 thereon against a cam 228 keyed on the main drive shaft 161. The latter cam has a high portion extending substantially halfway around its periphery and is effective upon a counterclockwise rotation of the shaft to rock the bellcrank 225 clockwise and thereby move the hook 224 rearwardly and hold the same in a rearward position during approximately the first half of the machine cycle, during which time the racks are advanced forwardly.

A spring 229 normally holds the hook member 224 in its illustrated raised position wherein it embraces the pin 222 on the box cam 217 so that as the hook member is moved rearwardly the box cam will be rocked to raise the accumulator gears into their additive position.

Means are provided for locating the hook member 224 in a lower position in coupling engagement with the pin 223 in response to depression of the subtract bar 122, subtotal bar 124, or total bar 125. This same means is effective upon depression of the nonadd bar 123 to locate the hook member 224 in an intermediate position wherein it is ineffective to move the cam 217 and the accumulator from their neutral positions during a machine cycle. For this purpose, the hook member 224 is coupled through a pin and slot connection 230 to a bellcrank 231 pivoted on a frame stud 232 and, in turn, coupled through a pin and slot connection 233 to a cam bar 234. The bar 234 is supported for fore and aft longitudinal movement by a pair of parallel links 235 pivotally suspended from frame pins 236.

The cam bar 234 is provided with cam surfaces, one of which is indicated at 237 underlying each of the control bar operated pins 185. The camming surfaces, i. e., 237, are so formed that upon depression of the subtract bar 122 (Fig. 7), subtotal bar 124 or the total bar 125, the cam bar 234 will be moved forward its fullest extent, whereby to lower the hook 224 into its lowermost position embracing the pin 223.

However, the camming surface associated with the nonadd control bar 123 is so formed that upon depression of the latter the cam bar 234 and hook 224 will be moved to their intermediate positions wherein the latter will be held out of coupling engagement with either of the pins 222 and 223.

During adding, subtracting and totalling operations, and after the high portion of cam 228 has passed the roller 227, the spring 226 will become effective to return the hook member 224, and along with it the cam 217, and accumulator, to their neutral positions before return of the racks to their home positions. However, in subtotalling operations it is necessary to maintain the accumulator in mesh with the racks throughout both the advance and return movements of the racks in order to reset the accumulator to its former value after the amount previously contained therein has been printed. Therefore, it is necessary in subtotalling operations to maintain the accumulator in mesh throughout the major portion of the subtotal machine cycle. For this purpose, a second cam 240 is keyed on shaft 161, having a high portion around the greater part of its periphery. The latter cam engages a roller 241 carried by a cam follower 242 also pivoted on shaft 167 and urged counterclockwise by a spring 243.

It will be noted that the cam follower 242 extends rearwardly a greater extent than follower 225 and a slot 244 in the former follower extends coextensively with a similar slot 245 in follower 225. A pin 246 carried by a link 247 normally rides in the rear portion of slot 244, out of engagement with slot 245. The forward end of the link 247 is provided with an elongated slot 248 embracing the pin 196 on the subtotal bar operated lever 195, and is normally held in a rearward position by a tension spring 249 extending between the pin 244 and a suitable frame pin.

Normally, in operations other than subtotalling, the pin 246 will ride solely in the slot 244, and consequently although both bellcranks 225 and 242 will be rocked by their respective cams, only the cam 228 will be effective to control and position the hook 224. However, during subtotalling operations, the link 247 will be drawn forwardly, positioning the pin 246 in engagement with both slots 244 and 245 so that the cam 240 will become effective to hold the hook 224 rearwardly during the major portion of the subtotalling cycle.

Although, as noted hereinbefore a subtotalling operation will normally be effected under control of the general control circuit, following an add operation, a totalling operation may be effected, instead, by merely removing link 247 which will render the cam 240 ineffective to control positioning of the accumulator.

*Modified embodiment*

Figures 9, 10:
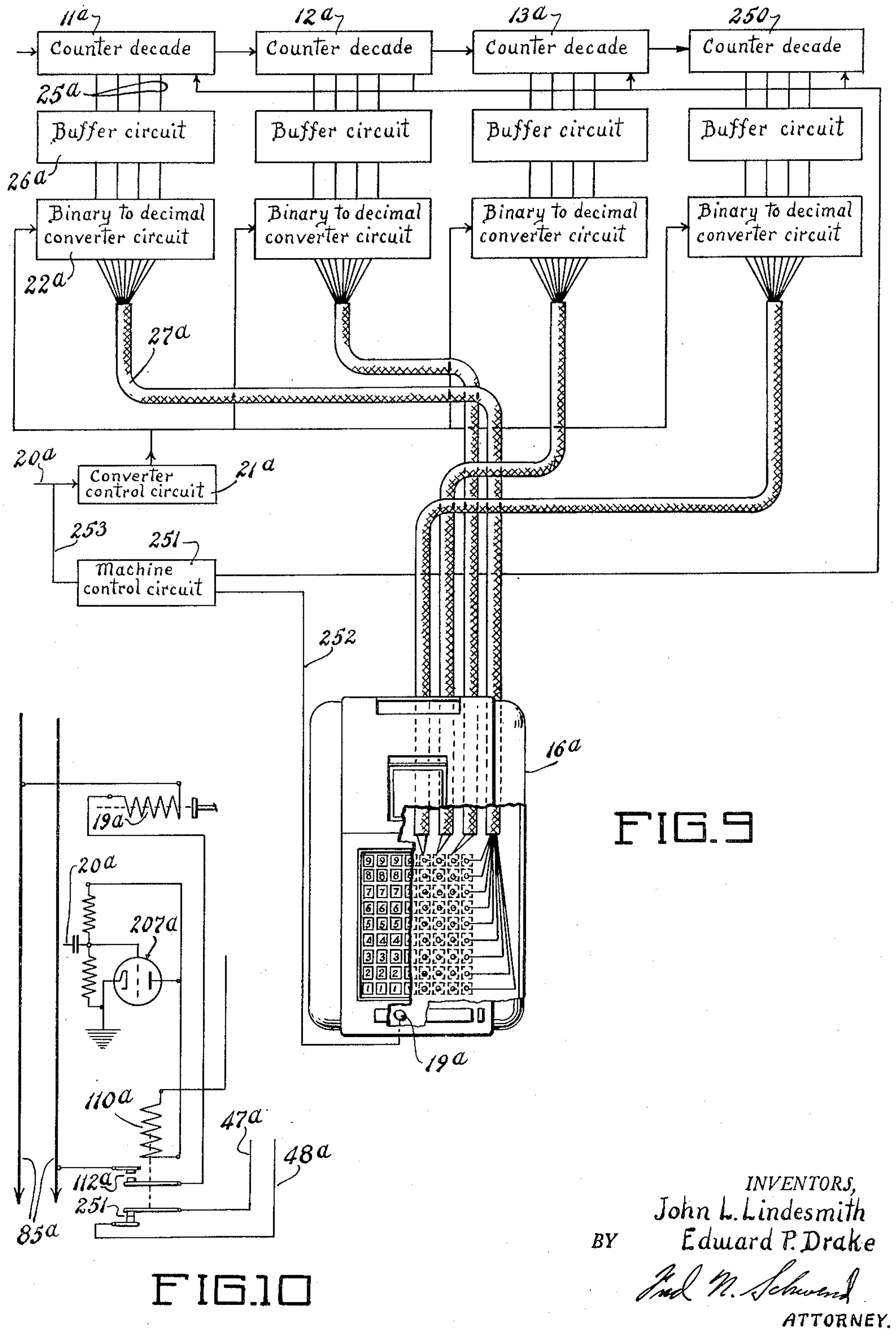
Fig. 9 is a general schematic view of a modified form of the invention.
Fig. 10 is a circuit diagram illustrating the machine control circuit for the system shown in Fig. 9.

Fig. 9 illustrates a modified form of the invention wherein the computing machine 16*a* acts merely as a printing instrumentality for printing, at certain times, amounts transferred thereto from several counter decades 11*a*, 12*a*, 13*a* and 250, each similar in all respects to each of the counter decades 11, 12 and 13. In such a system, it is necessary to read out or transfer amounts from the electronic counter to the machine 16*a* before the capacity of the electronic counter is reached. The four counter decades are provided with respective buffer circuits, i. e., circuit 26*a*, similar to buffer circuits 26, and binary-to-decimal converter relay circuits 22*a* similar to circuits 22, thus providing a capacity of 9,999.

The converter circuits 22*a* are each connected through its buffer circuit 26*a* to its respective counter decade by four lines 25*a*, similar to lines 25. The outputs from the various conversion circuits are fed by nine-line trunks like trunk 27*a* to the amount key solenoids in the respective denominational orders of the keyboard on the computing machine.

Read-out signals are transmitted along line 20*a* simultaneously to a matrix control circuit 21*a*, similar to circuit 20, and through line 253, to a machine control circuit 251, the latter, through line 252, controlling operation of an add control solenoid 19*a*, similar to solenoid 19, to cause a machine operation.

The machine accumulator and controls therefor are disabled or omitted from the machine 16*a*, and consequently, only a printing operation will be effected.

The machine control unit 251 (Fig. 10) differs from the machine control circuit 30 of Fig. 1 in that the machine control relay 110*a* (Fig. 10) included therein and controlled by the tube 207*a*, similar to tube 207 of Fig. 3, is effective to open normally closed contacts 251 in circuit with the anode supply lines 47*a* and 48*a*, similar to the anode supply lines 47 and 48. Also, the machine control relay 110*a* includes normally open contacts 112*a* connected in circuit with solenoid 19*a* across the power supply lines 85*a*. Thus, energization of relay 110*a* upon transmission of a signal pulse from line 20*a* to the igniter of tube 207*a* will effect a machine operation and will simultaneously effect resetting of the various counter decades to zero condition.

Having thus described the invention, what we desire to secure by United States Letters Patent is:

1. In a computing system, the combination comprising a multi-denomination counter, means for successively entering units to be counted into said counter, a multi-denomination accumulator, means controlled by said counter in response to a carry-over of a unit from the highest denomination thereof for entering a unit into a denomination of said accumulator corresponding to one denomination higher than said highest denomination of said counter, and means for thereafter selectively and concomitantly transferring amounts that have been entered subsequent to said entry of said unit from the remaining denominations of said counter to the denominations of said accumulator corresponding to the denominations of said counter which are lower than said highest denomination thereof.

2. In a computing system, the combination comprising a multi-denomination counter adapted to count according to a numerical system other than the decimal numerical system, means for successively entering units to be counted into said counter, a multi-denomination accumulator adapted to accumulate according to the decimal system, means controlled by said counter in response to counting a number representing ten raised to a predetermined power for entering the unit "1" in the appropriate denomination of said accumulator to represent said number, and means for thereafter selectively and concomitantly translating an amount counted by said counter that has been entered subsequent to said entry of the unit "1" into a decimal representation in toto and for entering said decimal representation into the appropriate denominations of said accumulator.

3. In a computing system, the combination comprising a multi-decade electronic counter, each decade of said counter comprising a plurality of stages and representing a decimal denomination of a numerical system other than the decimal system, a plurality of buffer circuits, each of said circuits including at least one thermionic tube connected to a respective one of said counter stages and controlled thereby, a multi-denomination computing machine including a multi-denomination accumulator, mechanism including differential actuators for actuating said accumulator, a plurality of normally ineffective translating circuit devices adapted to be controlled by respective ones of said tubes, said translating circuit devices including settable value selecting devices for controlling said differential actuators; said translating devices being capable of translating values of said first-mentioned numerical system into corresponding values of said decimal numerical system and of setting said value selecting devices accordingly, means including an add control relay for causing operation of said actuators to add amounts into said accumulator, means for energizing said relay, means including a totalling control relay for causing operation of said actuators to record amounts registered by said accumulator, a circuit including a condenser adapted upon discharge to energize said last mentioned means, means including said add control relay for charging said condenser, and means controlled by said machine for delaying discharge of said condenser until completion of an add operation by said machine.

4. In a computing system, the combination comprising a multi-decade electronic counter, each decade of said counter comprising a plurality of stages and representing a denomination of a numerical system other than the decimal system, a plurality of buffer circuits, each of said circuits including at least one thermionic tube connected to a respective one of said counter stages and controlled thereby, a multi-denomination computing machine including a multi-denomination accumulator, a plurality of normally ineffective translating circuit devices adapted to be controlled by respective ones of said tubes, said translating circuit devices including differential actuators for actuating said accumulator; settable value selecting devices for controlling said differential actuators, said translating devices being capable of translating values of said first-mentioned numerical system into corresponding values of said decimal numerical system and of setting said value selecting devices accordingly, means including an add control relay for causing operation of said actuators to add amounts into said accumulator, means for selectively energizing said relay, and means controlled by said counter in response to counting a number representing ten raised to a predetermined power for setting an appropriate one of said value selecting devices and for energizing said add control relay.

5. In a computing system, the combination comprising a multi-decade electronic counter, each decade of said counter comprising a plurality of stages and representing a decimal denomination of a number system other than the decimal system, a plurality of buffer circuits, each of said circuits including at least one thermionic tube connected to a respective one of said counter stages and controlled thereby, a multi-denomination computing machine including a multi-denomination accumulator, mechanism including differential actuators for actuating said accumulator, a plurality of normally ineffective translating circuit devices adapted to be controlled by respective ones of said tubes, said translating circuit devices including settable value selecting devices for controlling said differential actuators; said translating devices being capable of translating values of said first-mentioned numerical system into corresponding values of said decimal numerical system and of setting said value selecting devices accordingly, means including an add control relay for causing operation of said actuators to add amounts into said accumulator, means for selectively energizing said relay, means controlled by said counter in response to accumulating a number representing ten raised to a predetermined power for setting an appropriate one of said value selecting devices and for energizing said add control relay, means including a totalling control relay for causing operation of said actuators of total amounts from said accumulator, a circuit including a condenser adapted upon discharge to energize said last mentioned means, means including said add control relay for charging said condenser, and means controlled by said machine for delaying discharge of said condenser until completion of an add operation by said machine.

6. The combination according to claim 1 comprising a device responsive to operation of said last mentioned means for resetting said counter.

7. In a computing system having a multi-denominational accumulator, differential actuators therefor, means for driving said actuators, and selectively settable means for differentially controlling said actuators, the combination of means including a first relay for causing operation of said driving means to actuate said accumulator in a predetermined manner, means for energizing said relay, means including a second relay for causing operation of said driving means to actuate said accumulator in a second predetermined manner, a circuit including a condenser adapted upon discharge to energize said second relay, a circuit controlled by said first relay upon energization thereof for charging said condenser, and means controlled by said drive means for delaying discharge of said condenser until completion of said first mentioned actuation of said accumulator by said actuators.

References Cited in the file of this patent

UNITED STATES PATENTS

| | | |
|---|---|---|
| 2,318,591 | Couffignal | May 11, 1943 |
| 2,401,621 | Desch et al. | June 4, 1946 |
| 2,444,042 | Hartley et al. | June 29, 1948 |
| 2,514,035 | Dickinson | July 4, 1950 |
| 2,576,099 | Bray et al. | Nov. 27, 1951 |
| 2,591,007 | Rench | Apr. 1, 1952 |
| 2,604,262 | Phelps et al. | July 22, 1952 |
| 2,657,856 | Edwards | Nov. 3, 1953 |